United States Patent [19]

Maglich

[11] Patent Number: 5,709,172
[45] Date of Patent: *Jan. 20, 1998

[54] LEASH

[76] Inventor: Robert Maglich, 1134 Huron Ln., Henderson, Nev. 89015

[*] Notice: The term of this patent shall not extend beyond the expiration date of Pat. No. Des. 375,587.

[21] Appl. No.: 699,928

[22] Filed: Aug. 20, 1996

Related U.S. Application Data

[63] Continuation-in-part of Ser. No. 907,460, Jul. 6, 1992, Pat. No. Des. 375,587.

[51] Int. Cl.⁶ ................................................. A01K 27/00
[52] U.S. Cl. ........................................ 119/797; 119/795
[58] Field of Search ............................ 119/792, 795, 119/797, 770, 793, 798

[56] References Cited

U.S. PATENT DOCUMENTS

| D. 291,151 | 8/1987 | Dugan . | |
| D. 375,587 | 11/1996 | Maglich | D30/153 |
| 1,508,601 | 9/1924 | Huff . | |
| 2,861,547 | 11/1958 | Dale . | |
| 2,994,300 | 8/1961 | Grahling . | |
| 2,996,228 | 8/1961 | Bauman . | |
| 3,038,644 | 6/1962 | Johnson . | |
| 3,332,398 | 7/1967 | Mintz . | |
| 3,752,127 | 8/1973 | Baker . | |
| 3,817,218 | 6/1974 | Bongiovanni . | |
| 3,884,190 | 5/1975 | Gurrey . | |
| 4,298,091 | 11/1981 | Anderson . | |
| 4,763,609 | 8/1988 | Kulik . | |
| 4,879,972 | 11/1989 | Crowe et al. . | |
| 4,892,063 | 1/1990 | Garrigan . | |
| 5,462,019 | 10/1995 | Hong-Rung et al. | 119/795 |

FOREIGN PATENT DOCUMENTS

| 482832 | 4/1992 | European Pat. Off. . | |
| 1233020 | 10/1960 | France . | |
| 2673807 | 9/1992 | France | 119/798 |
| 461102 | 5/1928 | Germany . | |
| 634446 | 3/1950 | United Kingdom | 119/795 |
| 784166 | 10/1957 | United Kingdom . | |
| 2039705 | 8/1980 | United Kingdom . | |

*Primary Examiner*—Paul J. Hirsch
*Attorney, Agent, or Firm*—Richard C. Litman

[57] ABSTRACT

A dog leash which has a clip for attachment to a collar at one end and has a hand-hold at the other. The leash has a sliding ring on which a clip may be adjustably fastened to secure the leash to a fixed object, such as a tree. The clip is held onto the strap by stitching on either side of it which forms a loop in which the base of the clip resides. This stitching also secures the hand-hold. The dual functionality of this stitching reduces the amount of stitching required to make the leash, thereby reducing manufacturing costs.

4 Claims, 2 Drawing Sheets

LEASH

CONTINUING DATA

This application is a continuation-in-part of design patent application Ser. No. 07/907,460 filed Jul. 6, 1992, U.S. Pat. No. Des. 375,587.

BACKGROUND OF THE INVENTION

1. Field of the Invention

The present invention relates to a leash with a catch that allows it to be secured around a fixed object.

2. Description of the Prior Art

The instant invention is a dog leash which attaches to a dog's collar at one end and has a hand-hold at the other. Additionally, the leash has a sliding ring on which a clip may be adjustably fastened to secure the leash to a fixed object, such as a tree.

U.S. Pat. Nos. 1,508,601, issued on Sep. 16, 1924 to George Huff, 2,994,300, issued on Aug. 1, 1961 to Josephine Grahling, 2,996,228, issued on Aug. 15, 1961 to Malcolm W. Bauman, 3,038,644, issued on Jun. 12, 1962 to Arthur O. Johnson, 3,332,398, issued on Jul. 25, 1967 to Charles Mintz, 3,817,218, issued on Jun. 18, 1974 to Carl G. Bongiovanni, 3,884,190, issued on May 20, 1975 to Richard B. Gurrey, 4,879,972, issued on Nov. 14, 1989 to Dennis E. Crowe et al., 4,892,063, issued on Jan. 9, 1990 to Catherine M. Garrigan, and Des. 291,151, issued on Aug. 4, 1987 to Daniel Dugan, German Patent No. 461,102, issued on May 24, 1928, and French Patent No. 1,233,020, issued on Oct. 12, 1960, teach leashes, harnesses, and collars which either attach by clips or are adjustable. None of these patents are related to the instant invention which has a ring for attaching a clip and which may be adjusted.

Numerous patents teach the attachment of a clip to a ring to form a loop in a leash. For example U.S. Pat. Nos. 3,752,127, issued on Aug. 14, 1973 to Calvert W. Baker, and 4,763,609, issued on Aug. 16, 1988 to Bruce Kulik, and Great Britain Patent No. 2,039,705, issued on Aug. 20, 1980, teach means of forming a fixed loop by attachment of a clip to a fixed ring.

U.S. Pat. No. 2,861,547, issued on Nov. 25, 1958 to Joseph J. Dale, teaches adjusting the loop by attaching the clip to fixed rings located at various points along the leash, and U.S. Pat. No. 4,298,091, issued on Nov. 3, 1981 to Jeffrey J. Anderson, teaches a harness having a slidable clip and a fixed ring. Great Britain Patent No. 784,166, issued in 1957, teaches a loop that is adjustable by the sliding of a buckle, and European Patent No. 482,832, issued on Apr. 29, 1992 teaches a loop that is adjustable by the movement of a ring which is permanently attached to the second end of a leash.

None of the above inventions and patents, taken either singly or in combination, is seen to describe the instant invention as claimed.

SUMMARY OF THE INVENTION

The instant invention is a dog leash which has a clip for attachment to a collar at one end and has a hand-hold at the other. Additionally, the leash has a sliding ring on which a second clip may be adjustably fastened to secure the leash to a fixed object, such as a tree. The second clip is held onto the strap by stitching on either side of it which forms a loop in which the base of the clip resides. This stitching also secures the hand-hold. The dual functionality of this stitching reduces the amount of stitching required to make the leash, thereby reducing manufacturing costs.

Accordingly, it is a principal object of the invention to provide a leash which can be fastened to a fixed object.

It is another object of the invention to allow the leash to be adjustable so that it can be attached to objects of different sizes.

It is a further object of the invention to utilize stitching with dual functionalities for all of the efficiencies which such can obtain.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
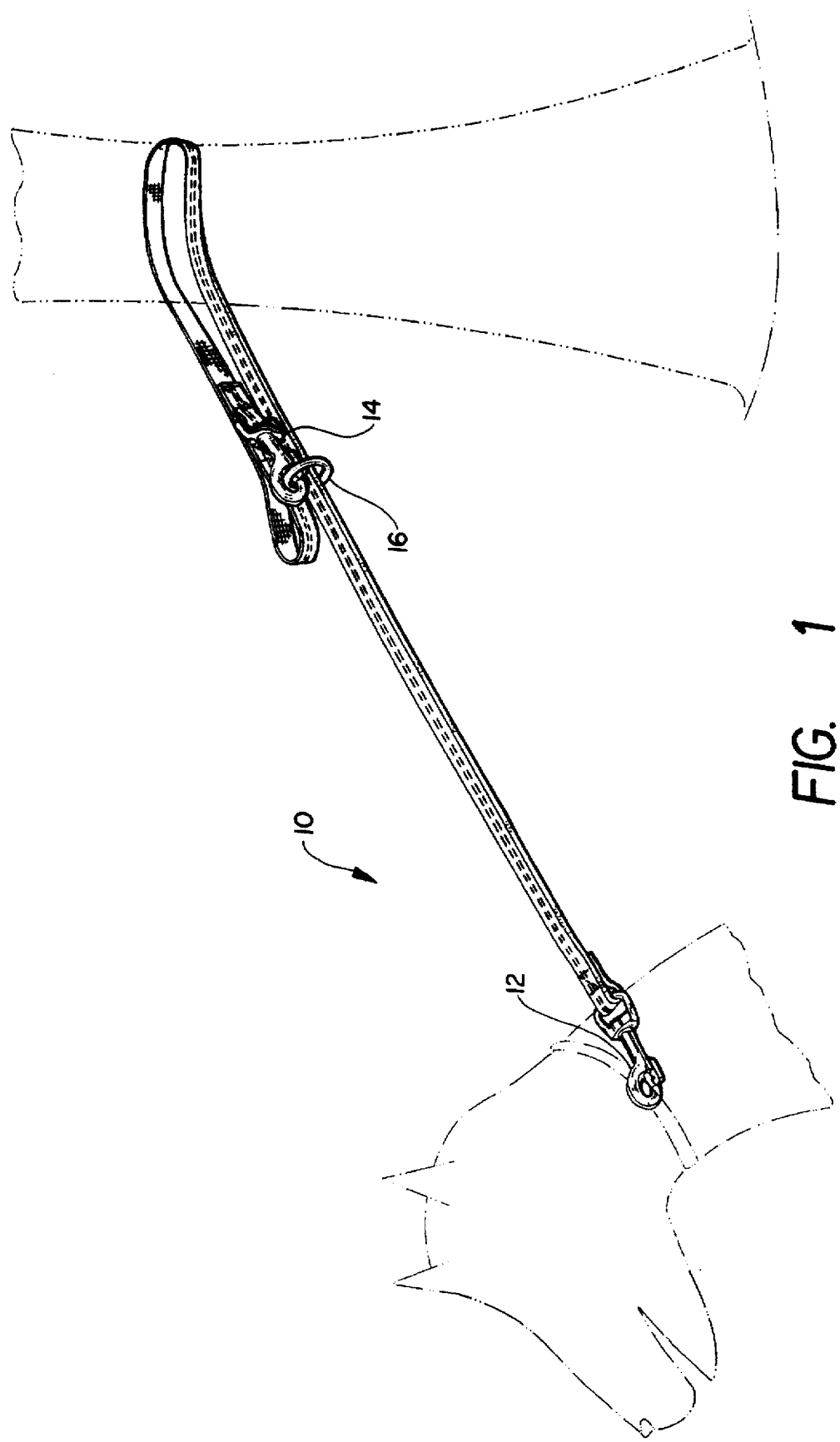
FIG. 1 is an environmental perspective view of a leash wrapped around a tree and shown with the clip attached to the ring.

An environmental view of the leash 10 is shown in FIG. 1. The first end of the leash 10 includes a first clip 12, preferably spring loaded, which is connected to the collar of an animal. The second end of the leash 10 includes a second clip 14 and a sliding ring 16, preferably metal. The second clip 14 and the ring 16 can be attached to secure the leash 10 around a tree or similar fixed object.

Figure 2:
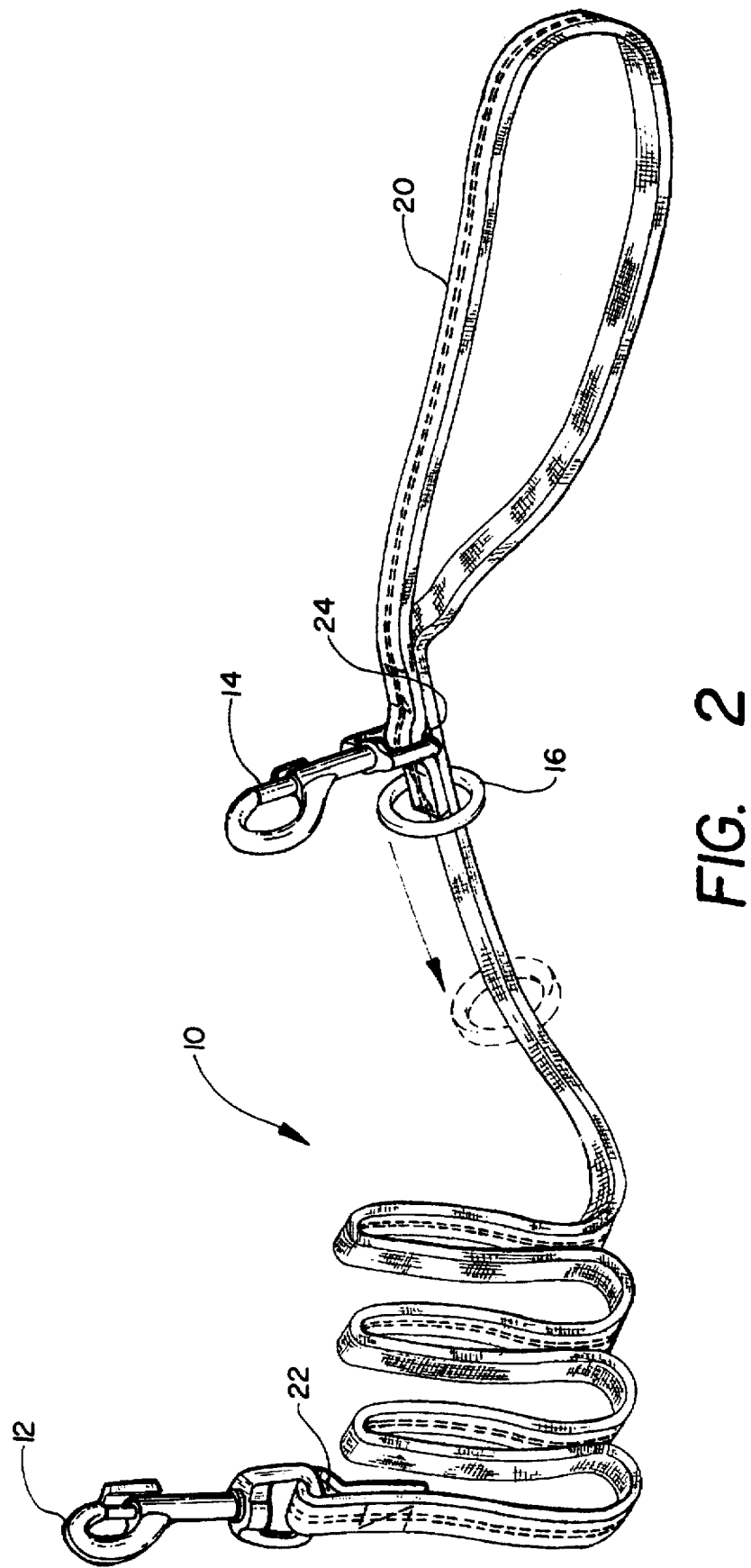
FIG. 2 is a perspective view of the leash as it would be used when it is not attached to a fixed object and showing the movement of the ring.

The details of the attachments to the leash 10 are best seen in FIG. 2. The first clip 12 is attached to the leash 10 by bending the first end of the leash 10, sliding it to an attachment point of the clip 12, and stitching it to part of the leash 10 so S as to form a loop 22 around the attachment point of the first clip 12. The hand-hold 20 is formed by wrapping the second end of the leash 10 in a large loop and back upon itself. The end of the loop is stitched to the main part of the leash 10. However the stitching is at a point before the termination of the second end of the leash. The free end of the second end of the leash 10 is slipped through an attachment point on the second clip 14 and stitched to the main part of the leash 10.

One can use the leash 10 by inserting one's wrist through the hand-hold 20. Alternatively, a user may fasten the leash around a fixed object. The hand-hold 20 and the second clip 14 are wrapped around the fixed object, the ring 16 is slid away from the second end of the leash 10 (as shown in FIG. 2), and the second clip is attached to the ring 16. The leash 10 attached to a fixed object is shown in FIG. 1.

It is to be understood that the present invention is not limited to the sole embodiment described above, but encompasses any and all embodiments within the scope of the following claims.

I claim:

1. A dog leash comprising:

a strap having a first end and an opposing second end;

a first clip permanently attached at said first end of said strap;

a permanent hand-hold defining a loop formed at said second end of said strap;

a second clip permanently attached to said strap proximate said hand-hold; and a slidable ring member disposed around said strap, said ring member being freely movable between said first clip and said second clip, said second clip engaging said ring member for removably attaching said second end of said strap around a fixed object.

2. The leash according to claim 1 wherein said hand-hold is formed by stitching proximate said second end of said strap.

3. The leash according to claim 1 wherein said second clip includes an attachment member permanently attached to said strap by stitching.

4. The leash according to claim 1 wherein said first clip has an attachment member permanently attached to said strap by stitching.

* * * * *